Patented May 7, 1940

2,199,944

UNITED STATES PATENT OFFICE 2,199,944

LUBRICANT

Adrianus Johannes van Peski and Johannes Andreas van Melsen, Amsterdam, Netherlands, assignors to Shell Development Company, San Francisco, Calif., a corporation of Delaware No Drawing. Application May 25, 1936, Serial No. 81,712. In the Netherlands June 1, 1935

11 Claims. (Cl. 87—9)

This invention relates to lubricants particularly suitable for lubrication under extreme pressure conditions.

It is well-known that the high pressuers occurring in certain types of gears and bearings may cause a film of lubricant to rupture with consequent damage to the machinery. It has been shown that mineral lubricating oils can be improved with regard to their protective effect on rubbing surfaces by the addition of certain substances, so that excessive wear, scuffing and seizure, which normally follow a break in the film of lubricant, can thus be prevented even under the most unfavorable pressure and speed conditions. Oils possessing this highly desirable property are called extreme pressure lubricants.

It is known that certain element or compounds of elements of the type of chlorine, sulfur, lead, phosphorus, are capable of imparting extreme pressure properties to lubricating oils when blended therewith. Among the compounds heretofore used are notable the lead soaps, phosphoric acid esters, free or loosely bound sulfur, and certain chlorinated organic compounds.

We have discovered that lubricating oils which are highly suitable for extreme pressure lubrication can be prepared by introducing into a mineral lubricating oil an oil-soluble complex compound, which complex consists of an organic or inorganic metal compound coupled with an alkyl, aryl, alkoxy or aroxy derivative of a non-metallic element of the 5th and 6th groups, right-hand side, of the periodic system of elements. The non-metallic elements of these groups are nitrogen, phosphorus, arsenic, antimony, oxygen, sulfur, selenium and tellurium. One or several of the organic radicals may contain substitution groups such as —NH$_2$, —OH, —SH, —COOH, and/or a halogen. By their solubility in mineral lubricating oils, these complex compounds are considerably more useful for extreme pressure purposes than the corresponding metal compounds or inorganic derivatives by themselves.

The general formula of our complex compounds is $$M_a A_m . (BR_n)_x$$

wherein M is a metal which forms a compound with a radical A, which compound in turn combines with the organic compound $BR_n$ to form an organic complex which is soluble in liquid hydrocarbons. A is an acid radical or an organic radical capable of forming metal organic compounds; $m$ is the number of radicals in the compound; $a$ is the number of metal atoms in the compound; B is a non-metallic element of the 5th and 6th groups, right-hand side, of the periodic system of elements in the hydride form; $n$ is the valence of B in the hydride form, $n$ being 2 or 3; $R_n$ is $R^1$ to $R^n$, $R^1$ to $R^n$ representing alkyl, alkenyl, cycloalkyl, aryl, alkoxy and aroxy radicals which may or may not be substituted; and $x$ is preferably not more than 4.

We have found that the following metals are capable of forming organic complex compounds of the type described which are most readily soluble in hydrocarbon oils: copper, silver, zinc, cadmium, mercury, nickel, cobalt, iron, and aluminum. Of these, copper and silver produce the most suitable, as well as the largest number of oil-soluble complexes. Among the radicals which represent A in the above formula, the fluoride, chloride, bromide, azide, thiocyanate, xanthogenate and fatty acid radicals produce the best extreme pressure complex compounds.

Preferred organic compounds $BR_n$ are the alkyl, alkenyl, cycloalkyl and aryl sulfides of 4 to 14 carbon atoms, such as di-ethyl sulfide, di-propyl sulfide, di-butyl sulfide, di-amyl sulfide, ethyl-propyl sulfide, ethyl iso-butyl sulfide, di-iso-butenyl sulfide, ethyl cyclohexyl sulfide, ethyl phenyl sulfide, iso-propyl phenyl sulfide, di-phenyl sulfide, phenyl tolyl sulfide, di-benzyl sulfide; and alkyl, aryl, alkoxy and aroxy phosphines of 3 to 21 carbon atoms, such as tri-methyl, di-methyl ethyl, methyl ethyl propyl, tri-ethyl, tri-propyl, tri-iso-propyl, tri-butyl, tri-amyl, di-methyl butyl, methyl di-phenyl tolyl, tri-tolyl, di-ethyl benzyl, tri-benzyl phosphines or phosphites.

Individual combinations of metal, acid radical and organic compounds which have proved of particular value as extreme pressure dopes, are as follows: if the metal is copper, the fluoride, chloride, bromide, azide, thiocyanate, xanthogenate or fatty acid salt with a sulfide; or the fluoride, thiocyanate and xanthogenate with a phosphine or phosphite; and if the metal is silver the fluoride, chloride, bromide, azide, thiocyanate and xanthogenate with a phosphine or phosphite.

While in the foregoing we have pointed out preferred compounds, it shall be understood that our invention is not limited thereto, but that it embraces other complexes covered by the formula hereinbefore described, provided they are soluble in hydrocarbon oils, of which complexes the following are examples: cupro acetyl acetone and tri-methyl phosphite, cupro-ureum and tri-ethyl phosphite, cupro phenolate and tri-ethyl phosphine, cupro acetyl amide and tri-ethyl phosphite, cupro cyclo pentadiene and tri-propyl phosphite, cupro iodide and di-n-butyl selenide, silver chloride and tri-propyl stibine, nickel oleate and tri-propyl phosphite, cupro bromide and di-n-butyl-telluride, mono cupro phosphate and tri-propyl phosphine, silver chloride and tri-methyl arsenite, cadmium butyrate and tri-methyl amine, silver oleate and tri-methyl amine, cupro oleate and tri-ethanol amine, and ethyl-propyl ether, tri-ethyl aluminum and di-ethyl ether, cupro chloride and ββ'di-methoxy di-ethyl sulfide, cupro chloride and ββ'di-chlor di-ethyl-ether, cupro chloride and ethylene glycol mono-methyl ether, cupro sulfate and tri-ethyl phosphine, cupro-n-propyl mercaptide and tri-propyl phosphine, cupro rhodanide and tripropyl phosphine, silver azide and tri-ethyl phosphite, cupro bromide and dioctyl sulfide, cupro chloride and amyl cetyl sulfide, cupro bromide and di-isobutenyl sulfide.

The complex compounds are produced by simply mixing the metal compound $M_aA_m$ with the organic component $BR_n$, in the ratios of 1 mol of $M_aA_m$ to 1 or several mols of $BR_n$. Sometimes the reaction mixture warms up considerably and may have to be cooled to avoid losses or decomposition of some of the compounds. The resulting product may then be introduced into the lubricating oil in any suitable manner.

The complex compounds may also be prepared in the manner illustrated in the following examples:

I. Cuprialcoholate-tripropyl phosphine is prepared by mixing 5.7 grams of cuprialcoholate suspended in benzene with 12.0 grams of tri-n-propyl phosphine. A small amount of heat is developed and the benzene-soluble complex compound is formed, which may be obtained by filtering the benzene solution and evaporating the benzene.

II. Cupromethyl propyl ketone-pyridine is prepared as follows:

A solution of sodium methyl propyl ketone is produced by causing sodium amide to react on methyl propyl ketone dissolved in water-free ether. 50 cc. of this solution, containing 2 mols sodium methyl propyl ketone per liter, are mixed with 14.4 grams cupro bromide and 15.8 grams pyridine at a temperature of about −15° C. The mixture was stirred at this temperature during 1 hour and then at room temperature during 3 hours. The complex compound formed in this way is introduced into a light hydrocarbon, the solution thus obtained is filtered and the pure complex compound recovered by evaporating the solvent.

If desired, the manufacture of our complex compounds may be carried out in solution of a suitable solvent, for instance, of a lubricating oil, by dissolving or suspending first one component in the solvent, then adding the other component to the solution or suspension, and agitating the mixture if necessary at a somewhat elevated temperature of the order of 70–100° C., until the complex formation is completed.

The amount of our compounds required to impart extreme pressure properties varies from about 1 to 10%. Amounts below 1% have, in general, not enough effect to convert mineral oils to extreme pressure lubricants, and amounts greatly in excess of 10% are in most cases impractical because of the cost.

In the following illustrative examples the manufacture and effectiveness as extreme pressure compounds of several of our complex compounds is described:

The di-butyl sulfides of cupro chloride, bromide and iodide were prepared by shaking one mol of the respective cupro halides with two mols of di-butyl sulfide. The halides dissolved in the sulfide with evolution of heat, producing colorless liquids. From 2½ to 10% of these liquids were dissolved in a mineral lubricating reference oil and the resulting blends were tested in the four-ball apparatus by Boerlage described in "Engineering," July 14, 1933. In this apparatus the wear of the balls as well as the welding pressure can be determined. The following results were obtained:

| Compound added | Welding pressure in kgs. | Wear of top ball, diameter of ring in millimeters |
|---|---|---|
| Reference oil | 175 | 2.60 at 130 kgs. |
| Reference oil+2½% $CuCl.2(C_4H_9)_2S$ | 600+ | 1.00 at 300 kgs. 1.59 at 600 kgs. |
| Reference oil+5% $CuBr.2(C_4H_9)_2S$ | 600+ | 1.10 at 300 kgs. 1.61 at 600 kgs. |
| Reference oil+10% $CuI.2(C_4H_9)_2S$ | 350 | 1.00 at 300 kgs. |

Similar results were obtained when compounding the lubricating reference oil with a series of double compounds of silver salts with phosphines and phosphites. The double compounds were produced by mixing one mol of the respective silver salts with two mols of tri-propyl phosphine or tri-ethyl phosphite. The mixtures reacted energetically so that cooling became necessary. After the reaction had subsided, the mixtures were heated to from 80 to 100° C. until all the silver salts had dissolved, which was taken as an indication of the completeness of complex formation. 10% of the respective complex compounds were dissolved in the aforementioned reference oil, and the blends so produced were tested in the Boerlage four-ball apparatus with the following results:

| Compound added | Welding pressure in kgs. | Wear of top ball, diameter of ring in millimeters. |
|---|---|---|
| Reference oil+10% $AgCl.2P(C_2H_5O)_3$ | 600+ | 1.39 at 550 kgs. |
| Reference oil+10% $AgBr.2P(C_2H_5O)_3$ | 550+ | 1.40 at 550 kgs. |
| Reference oil+10% $AgN_3.2P(C_2H_5O)_3$ | 600 | 1.45 at 550 kgs. |
| Reference oil+10% $AgBr.2P(C_3H_7)_3$ | 400 | 1.82 at 350 kgs. |
| Reference oil+10% $AgN_3.2P(C_3H_7)_3$ | 600+ | 1.45 at 550 kgs. |

Since certain of our complex compounds are somewhat corrosive, we counteract this corrosion by adding to the extreme pressure lubricant containing our compounds, a small amount of an effective corrosion inhibitor, such as a high molecular weight polycarboxylic acid, petroleum base, or an oil-soluble pickling inhibitor.

High molecular weight polycarboxylic acids of the type described in the Moser application, Ser. No. 12,247, filed March 21, 1935, which acids are soluble in mineral lubricating oils and have 10 or more carbon atoms, do not only inhibit corrosion, but are also capable of considerably enhancing the extreme pressure properties of the compounds herein described. For instance, when adding to a solution of 10% $CuI.2(C_4H_9)_2S$ in the reference oil, 1.8% by weight cetenyl succinic acid, the welding pressure is raised from 350 kgs. to above 600 kilograms, while the wear at 300 kilograms remains approximately unchanged.

We claim as our invention:

1. An extreme pressure lubricant comprising mineral lubricating oil and from about 1 to 10% by weight of a complex compound soluble in the said oil, having the formula $M_aA_m(BR_n)_x$ in which M is a metal selected from the group consisting of copper, silver, zinc, cadmium, mercury, nickel, cobalt, iron and aluminum, A is a radical capable of forming a compound with the metal M, $m$ is the number of radicals A in the compound, $a$ is the number of metal atoms in the compound, B is an element of the 5th and 6th groups, right hand side, of the periodic system of elements of the class consisting of nitrogen, phosphorus, arsenic, antimony, oxygen, sulfur, selenium and tellurium, $n$ is a numeral equal to the valence of B, R is $R^1$ to $R^n$, $R^1$ to $R^n$ being radicals selected from the group of alkyl, alkenyl, cycloalkyl, aryl, alkoxy and aroxy radicals and $x$ is a numeral from 1 to 4.

2. An extreme pressure lubricant comprising mineral lubricating oil and a small quantity of a high molecular weight polycarboxylic acid and from about 1 to 10% by weight of a complex compound soluble in the said oil, having the formula $M_aA_m(BR_n)_x$ in which M is a metal selected from the group consisting of copper, silver, zinc, cadmium, mercury, nickel, cobalt, iron and aluminum, A is a radical capable of forming a compound with the metal M, $m$ is the number of radicals A in the compound, $a$ is the number of metal atoms in the compound, B is an element of the 5th and 6th groups, right hand side, of the periodic system of elements of the class consisting of nitrogen, phosphorus, arsenic, antimony, oxygen, sulfur, selenium and tellurium, $n$ is a numeral equal to the valence of B, R is $R^1$ to $R^n$, $R^1$ to $R^n$ being radicals selected from the group of alkyl, alkenyl, cycloalkyl, aryl, alkoxy and aroxy radicals and $x$ is a numeral from 1 to 4.

3. An extreme pressure lubricant comprising a mineral lubricating oil and from about 1 to 10% of a compound having the formula $MA_m(BR_n)_x$ in which M is copper, A is an acid radical of an acid selected from the class consisting of hydrofluoric, hydrochloric, hydrobromic, hydrazoic, thiocyanic, xanthogenic and fatty acids, $m$ is the number of radicals A equal to the valence of M, B is an element of the fifth and sixth groups of the periodic system selected from the class consisting of nitrogen, phosphorus, arsenic, antimony, oxygen, sulfur, selenium and tellurium, $n$ is a numeral equal to the lowest valence of B, R is $R^1$ to $R^n$ where $R^1$ to $R^n$ are radicals selected from the group consisting of alkyl, alkenyl, cycloalkyl, aryl, alkoxy and aroxy radicals having a combined content of 3 to 21 carbon atoms, and $x$ is a numeral from 1 to 4.

4. The extreme pressure lubricant of claim 1, in which at least one of the radicals $R^1$ to $R^n$ contains substitution groups selected from the class consisting of —$NH_2$, —OH, —SH, —COOH, halogen.

5. An extreme pressure lubricant comprising a mineral lubricating oil and from about 1 to 10% of a compound having the formula $$M_aA_m.(BR_n)_x$$

in which M is a metal selected from the group consisting of copper, silver, zinc, cadmium, mercury, nickel, cobalt, iron and aluminum, A is a radical capable of forming a compound with the metal M, $a$ and $m$ are the numbers of metal atoms and radicals respectively, B is an element of the 5th and 6th groups of the periodic system, right-hand side, of the class consisting of nitrogen, phosphorus, arsenic, antimony, oxygen, sulfur, selenium and tellurium; $n$ is a numeral equal to the lowest valence of B, R is $R'$ to $R^n$, $R'$ to $R^n$ being radicals selected from the group of alkyl, alkenyl, cycloalkyl, aryl, alkoxy and aroxy radicals having a combined content of 3 to 21 carbon atoms, and $x$ is a numeral from 1 to 4.

6. An extreme pressure lubricant comprising a mineral lubricating oil and from about 1 to 10% of a compound having the formula $MA_m(BR_n)_x$ in which M is a metal selected from the group consisting of copper, silver, zinc, cadmium, mercury, nickel, cobalt, iron and aluminum, A is an acid radical of an acid selected from the class consisting of hydrofluoric, hydrochloric, hydrobromic, hydrazoic, thiocyanic, xanthogenic and fatty acids, $m$ is the number of radicals A equal to the valence of M, B is an element of the fifth and sixth groups of the periodic system selected from the class consisting of nitrogen, phosphorus, arsenic, antimony, oxygen, sulfur, selenium and tellurium, $n$ is a numeral equal to the lowest valence of B, R is $R^1$ to $R^n$ where $R^1$ to $R^n$ are radicals selected from the group consisting of alkyl, alkenyl, cycloalkyl, aryl, alkoxy and aroxy radicals having a combined content of 3 to 21 carbon atoms, and $x$ is a numeral from 1 to 4.

7. An extreme pressure lubricant comprising a mineral lubricating oil and from about 1 to 10% of a complex reaction product consisting of 1 mol of a copper salt coupled with from 1 to 4 mols of a thioether $R_1$—S—$R_2$ in which $R_1$ and $R_2$ are radicals selected from the group consisting of alkyl, alkenyl, cycloalkyl, aryl, alkoxy and aroxy radicals, the acid radical of said salt being the acid radical of an acid selected from the class consisting of hydrofluoric, hydrochloric, hydrobromic, hydrazoic, thiocyanic, xanthogenic, and fatty acids.

8. An extreme pressure lubricant comprising a mineral lubricating oil and from about 1 to 10% of a complex reaction product consisting of 1 mol of a silver salt coupled with from 1 to 4 mols of a compound selected from the group consisting of phosphines and phosphites containing 3 hydrocarbon radicals and from 3 to 21 carbon atoms, the acid radical of said salt being the acid radical of an acid selected from the class consisting of hydrofluoric, hydrochloric, hydrobromic, hydrazoic, thiocyanic, xanthogenic, and fatty acids.

9. An extreme pressure lubricant comprising a mineral lubricating oil coupled with from about 1 to 10% of a complex reaction product consisting of 1 mol of a copper halide and from 1 to 4 mols of a thioether $R_1$—S—$R_2$ containing from 4 to 14 carbon atoms in which $R_1$ and $R_2$ are radicals of the class consisting of alkyl, alkenyl, cycloalkyl, aryl, alkoxy and aroxy radicals.

10. An extreme pressure lubricant comprising a mineral lubricating oil coupled with from about 1 to 10% of a complex reaction product consisting of 1 mol of copper chloride and from 1 to 4 mols of a dialkyl thioether containing from 4 to 14 carbon atoms.

11. An extreme pressure lubricant comprising a mineral lubricating oil coupled with from about 1 to 10% of a complex reaction product consisting of 1 mol of copper fluoride and from 1 to 4 mols of a compound selected from the group consisting of phosphines and phosphites containing 3 hydrocarbon radicals and from 3 to 21 carbon atoms.

ADRIANUS JOHANNES VAN PESKI.
JOHANNES ANDREAS VAN MELSEN.